United States Patent
Lei

(10) Patent No.: US 10,678,914 B2
(45) Date of Patent: Jun. 9, 2020

(54) VIRUS PROGRAM DETECTION METHOD, TERMINAL, AND COMPUTER READABLE STORAGE MEDIUM

(71) Applicant: Tencent Technology (Shenzhen) Company Limited, Shenzhen (CN)

(72) Inventor: Jingwei Lei, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 143 days.

(21) Appl. No.: 16/006,488

(22) Filed: Jun. 12, 2018

(65) Prior Publication Data
US 2018/0293380 A1    Oct. 11, 2018

Related U.S. Application Data

(63) Continuation of application No. PCT/CN2017/083240, filed on May 5, 2017.

(30) Foreign Application Priority Data

May 6, 2016 (CN) .......................... 2016 1 0300614

(51) Int. Cl.
G06F 21/56    (2013.01)

(52) U.S. Cl.
CPC ............ G06F 21/562 (2013.01); G06F 21/56 (2013.01); G06F 2221/033 (2013.01)

(58) Field of Classification Search
CPC ... G06F 21/562; G06F 21/56; G06F 2221/033
See application file for complete search history.

(56) References Cited

U.S. PATENT DOCUMENTS 5,871,697 A * 2/1999 Rothberg ............... C12N 15/10
                                                              422/68.1
7,007,166 B1 * 2/2006 Moskowitz ........... G06T 1/0021
                                                              380/46

(Continued)

FOREIGN PATENT DOCUMENTS

CN    101281571 A    10/2008
CN    103139644 A     6/2013

(Continued)

OTHER PUBLICATIONS

International Search Report and Written Opinion dated Jul. 20, 2017 for PCT/CN2017/083240 (8 pp.).

(Continued)

*Primary Examiner* — Abu S Sholeman
(74) *Attorney, Agent, or Firm* — Brinks Gilson & Lione

(57) ABSTRACT

This disclosure relates to detection of viruses. In one implementation, a virus detection method performed by a terminal device is disclosed. The method may include obtaining a full characteristic features of a first file, the first file being a sample file collected by a client application of the terminal device, and the full characteristic features of the first file being used to uniquely determine all components of the first file, obtaining a first binary hash sequence based on the full characteristic features of the first file and by using a preset hash algorithm, calculating similarity parameters between the first binary hash sequence and reference binary hash sequences in an antivirus database, each binary hash sequence in the antivirus database corresponding to one type of virus-infected file, and determining the first file as a virus-infected file when at least one of the similarity parameters is less than a preset similarity threshold.

17 Claims, 6 Drawing Sheets

(56) References Cited

U.S. PATENT DOCUMENTS

| | | | | |
|---|---|---|---|---|
| 2001/0007985 | A1* | 7/2001 | Rothberg | C12N 15/10 |
| 2005/0044417 | A1* | 2/2005 | Carpentier | G06F 16/137 |
| | | | | 726/4 |
| 2006/0095521 | A1* | 5/2006 | Patinkin | G06Q 10/107 |
| | | | | 709/206 |
| 2008/0134337 | A1* | 6/2008 | Crescenzo | G06F 21/565 |
| | | | | 726/24 |
| 2008/0147612 | A1* | 6/2008 | Gryaznov | G06F 21/564 |
| 2015/0096023 | A1* | 4/2015 | Mesdaq | H04L 63/145 |
| | | | | 726/23 |

FOREIGN PATENT DOCUMENTS

| | | |
|---|---|---|
| CN | 103839002 A | 6/2014 |
| CN | 104700033 A | 6/2015 |

OTHER PUBLICATIONS

Office Action dated Oct. 15, 2019 for Chinese Application No. 201610300614.0 with concise English Translation, 7 pages.

* cited by examiner

VIRUS PROGRAM DETECTION METHOD, TERMINAL, AND COMPUTER READABLE STORAGE MEDIUM

RELATED APPLICATION

This application claims priority to PCT application PCT/CN2017/083240, filed with Chinese Patent Office on May 5, 2017, which claims priority to Chinese Patent Application No. 201610300614.0, filed with the Chinese Patent Office on May 6, 2016, both entitled "VIRUS PROGRAM DETECTION METHOD, TERMINAL, AND COMPUTER READABLE STORAGE MEDIUM", which are incorporated by reference in their entirety.

FIELD OF THE TECHNOLOGY

This disclosure relates to an Internet technology, and specifically relates to an information updating/exchange method, an apparatus and a server.

BACKGROUND

In a mobile terminal installed with open-source Android operating system, a user may inadvertently download an application or a file that carries a virus. Existing techniques for detecting virus are usually based on detection of point features. A point feature, for example, may be a character string or a code sequence. When an antivirus engineer detects that an array of sample files that are infected by a virus with a same point feature, e.g., containing a character string or a code sequence, the character string or the code sequence may be recorded and stored into an antivirus database. If a file is subsequently detected to include such a feature stored in the antivirus database, the file may be determined as infected by the virus.

A disadvantage of this existing technology lies in that the virus detection method based on a point feature can be easily defeated by a virus developer. Currently, there has been no efficient solution to the problem yet.

SUMMARY

To resolve the existing technical problem, embodiments of the present disclosure provide a virus program detection method, a terminal and a computer readable storage medium, which are capable of resolving the problem that a virus detection method based on a point feature in the existing technology is easy to be defeated by virus designers.

To achieve the foregoing objective, the technical solutions of the embodiments of the present disclosure are implemented as follows.

An embodiment of the present disclosure provides a virus program detection method, including obtaining a full characteristic features of a first file, the first file being a sample file collected by a client, and the full characteristic features being used to uniquely determine all components of the first file; obtaining a first sequence based on the full characteristic features and by using a preset algorithm; respectively calculating similarity parameters between the first sequence and multiple sequences in an antivirus database, each sequence in the antivirus database corresponding to one type of virus-infected file; and determining the first file as a virus-infected file when the similarity parameter is less than a preset threshold.

An embodiment of the present disclosure further provides a terminal, including a feature collection module, a virus detection module, and a virus prevention module, the feature collection module being configured to obtain a full characteristic features of a first file, the first file being a sample file collected by a client, and the full characteristic features being used to uniquely determine all components of the first file; the virus prevention module being configured to store multiple sequences, each sequence corresponding to one type of virus-infected file; and the virus detection module being configured to: obtain a first sequence based on the full characteristic features extracted by the feature collection module and by using a preset algorithm; respectively calculate similarity parameters between the first sequence and the multiple sequences in the virus prevention module; and determine the first file as a virus-infected file when the similarity parameter is less than a preset threshold.

An embodiment of the present disclosure further provides a computer readable storage medium, storing program instructions, when executing the stored program instructions, a processor performing the following steps: obtaining a full characteristic features of a first file, the first file being a sample file collected by a client, and the full characteristic features being used to uniquely determine all components of the first file; obtaining a first sequence based on the full characteristic features and by using a preset algorithm; respectively calculating similarity parameters between the first sequence and multiple sequences in an antivirus database, each sequence in the antivirus database corresponding to one type of virus-infected file; and determining the first file as a virus-infected file when the similarity parameter is less than a preset threshold.

The embodiments of the present disclosure provides a virus program detection method, a terminal and a computer readable storage medium. The method includes: obtaining a full characteristic features of a first file, the first file being a sample file collected by a client, and the full characteristic features being used to uniquely determine all components of the first file; obtaining a first sequence based on the full characteristic features and by using a preset algorithm; respectively calculating similarity parameters between the first sequence and multiple sequences in an antivirus database, each sequence in the antivirus database corresponding to one type of virus-infected file; and determining the first file as a virus-infected file when the similarity parameter is less than a preset threshold. In this way, by using the technical solutions of the embodiments of the present disclosure, the virus detection method based on the full characteristic features effectively resolves the problem that a virus detection method based on a point feature in the existing technology is easy to be avoided, and resolves a problem that a virus cannot be detected when a variation occurs. For some viruses that have a small circulating range and do not widely spread, the technical solutions of the embodiments of the present disclosure may implement virus detection by means of a full characteristic features, greatly improving the accuracy of virus detection.

DESCRIPTION OF EMBODIMENTS

The following further describes various implementations the present disclosure in detail with reference to the accompanying drawings.

Embodiment 1

Figure 1:
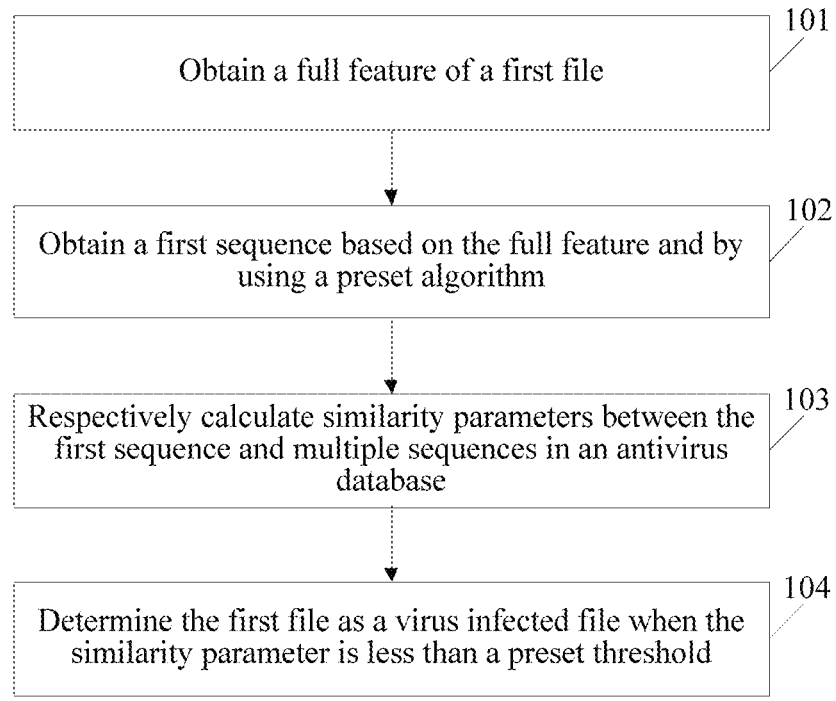
FIG. 1 is a schematic flowchart of a virus program detection method according to Embodiment 1 of the present disclosure.

In one implementation, a virus program detection method is provided, as shown by the flowchart of FIG. 1. The virus program detection method includes:

Step S101: Obtain full characteristic features of a first file, the first file being a sample file collected by a client application (alternatively referred to as a client) or external source, and the full characteristic features being used to uniquely determine all components of the first file;

Step S102: Obtain a first sequence based on the full characteristic features and by using a preset algorithm;

Step S103: Calculate similarity parameters between the first sequence and multiple sequences in an antivirus database, each sequence in the antivirus database corresponding to one type of virus-infected file; and Step S104: Determine that the first file as a virus-infected file when the similarity parameter is less than a preset threshold.

The virus program detection method in the implementation above may be used for detecting whether a file in an Android system is infected by virus. The virus program detection method may be implemented in a terminal (alternatively referred to as a terminal device). The terminal may include but is not limited to a mobile terminal such as a mobile phone or a tablet computer. The terminal may alternatively be an electronic device such as a personal computer (PC). The virus program detection method may alternatively be implemented in a server. The detailed implementation is described below using a terminal as an example.

In step S101 of this embodiment, the terminal may directly receive the full characteristic features (alternatively referred to as features) of the first file reported by a client application (alternatively referred to as a client) or external source. The client application may run on the terminal. Alternatively, the terminal may receive the first file from the client application or the external source, and extract the full characteristic features of the first file by analyzing the received first file. The first file may include but is not limited to an Android package (APK) file. The first file may alternatively be a file in any format supported by the terminal.

In this embodiment, the full characteristic feature of the first file is extracted. The full characteristic features uniquely determine all components of the first file. Specifically, the first file may include a plurality of components, for example, may include a plurality of subfiles. The extracted full characteristic features of the first file correspondingly may include characteristic features for each subfile. The characteristic features of each subfile may include but are not limited to the identifier, the size, and the format of each subfile, and a character string and/or a code sequence included in each subfile, or the like.

In step S102 of this embodiment, obtaining a first sequence based on the full characteristic features and by using a preset algorithm, for example, may include: obtaining a first sequence based on the full characteristic features and, e.g., by using a SIMHASH algorithm (or SimHash, or fuzzy hash). For example, each characteristic feature is first processed to generate a hash value (of a predetermined hash length) by using a hash algorithm, and the generated hash values are further used to generate a weighted digit string according to a preset weight. In particular, a corresponding bit of hash sequence corresponding to each feature is accumulated with weight among the features, to generate a sequence of numbers; and the generated sequence of numbers are converted into a sequence of binary bits including only zeros and ones, to obtain a first sequence. A specific calculation process is not described in detail in this embodiment. The first sequence may be an N-bit binary sequence. N is a positive integer. In one implementation, the first sequence may be a 128-bit binary sequence. Correspondingly, the hash length for such an implementation is 128 bits.

In step S103 of this embodiment, before calculating similarity parameters between the first sequence and multiple sequences in an antivirus database, the method further includes: collecting a plurality of virus sample files; extracting a full characteristic features of each virus sample file, the full characteristic features of the virus sample file being used to uniquely determine all components of the virus sample file; and obtaining a sequence of each of the virus sample files based on the full characteristic features and by using a preset algorithm, and generating an antivirus database based storing sequences for the obtained plurality of virus sample files. The term virus sample file refers to a file infected by a virus.

In other words, before detecting whether a file is virus-infected, the antivirus database is first established. The antivirus database includes hash sequences corresponding to virus sample files. The hash sequence for each virus sample file may be obtained in a similar manner in which the first sequence is obtained, as described in step S101 to step S102. That is, full characteristic features are extracted from each virus sample file, and the corresponding hash sequence is obtained based on the extracted full characteristic features and by using the preset algorithm (e.g., the SIMHASH algorithm). Each hash sequence in the antivirus database may correspond to one type of virus-infected file. It can be understood that the plurality of virus sample files may be infected with a same type of virus. When establishing the antivirus database, one or several minimum set of hash sequences may be stored for one type of virus. That is, the hash sequence stored in the antivirus database includes features of all types of virus-infected files as much as possible (namely, hash sequences corresponding to virus-infected files), thereby reducing detection time and improving detection accuracy and coverage.

Figure 2:
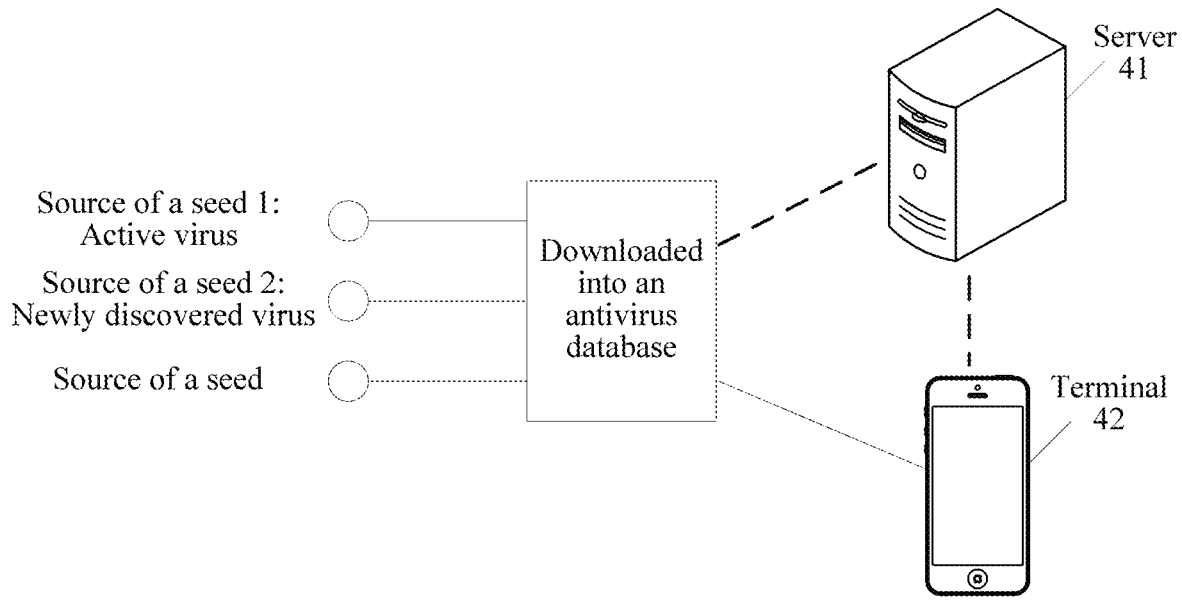
FIG. 2 is a schematic diagram showing establishment of an antivirus database according to Embodiment 1 of the present disclosure.

In some implementations, the antivirus database may be established by using a virus sample provided by another virus engine or a virus sample reported by a terminal. FIG. 2 is a schematic diagram showing establishment of an antivirus database according to Embodiment 1 of the present disclosure. As shown in FIG. 2, a terminal 42 may directly establish the antivirus database by using a virus sample provided by a virus engine. As another implementation, a server 41 may directly establish the antivirus database by using a virus sample provided by a virus engine. The established antivirus database may be transmitted to the terminal 42 by using a communication network. A virus sample in the antivirus database may be obtained from a plurality of sources: an active virus, a newly discovered virus and so on.

Based on this, in step S104 of this embodiment, the first file is determined as infected when the similarity parameter is less than a preset threshold. Correspondingly, the first file may be determined as uninfected when the similarity parameter is not less than a preset threshold.

In some implementations, the similarity parameter may comprise a Hamming Code distance. Particularly, a Hamming Code distance between the first sequence and each sequence in the antivirus database may be calculated. Exclusive-OR calculation is performed between corresponding bits of two sequences which are alternative referred to as two code words. The number of ones in an obtained result provides a Hamming Code distance between the two code words or sequences. For example, suppose that first code word is 10101, and a second code word is 00110. In comparison, values of first bit, fourth bit and fifth bit of the two code words are all different, and a Hamming Code distance between the two code words is three. In some implementations, a Hamming Code distance between the first sequence and each sequence in the antivirus database may be calculated, and the Hamming Code distance is determined as to whether it is less than a preset threshold. The preset threshold may be preset according to human experience. In some exemplary implementation, a value of the preset threshold may be between one to ten. When the obtained Hamming Code distance between the first sequence and a sequence in the antivirus database corresponding to an infected file is less than the preset threshold, it may mean that the first file and corresponding file in the antivirus database are sufficiently similar. It also signifies that the possibility that the first file is infected by a virus that infects the first file is sufficiently large, so that the first file may be determined as a virus-infected file. Correspondingly, when the obtained Hamming Code distance is not less than the preset threshold, it signifies that the first file and corresponding file in the antivirus database is dissimilar and that the possibility that the first file is infected by a virus that infects the first file is sufficiently small, so that the first file may be determined as an uninfected file with respect to the virus that infects the first file.

The first sequence may be compared to each of the sequences in the antivirus database corresponding to various infected sample files and various type of viruses to obtain a plurality of Hamming Code distances. In one implementation, the file corresponding to the first sequence may be identified as uninfected when all Hamming Code distances are less than the predetermined threshold, and the file corresponding to the first sequence may be identified as infected when at least one of the Hamming Code Distance is not less than the predetermined threshold.

By using the technical solutions of the embodiment of the present disclosure, the virus detection method based on the full characteristic features effectively resolves the problem that a virus designer can easily get around an existing virus detection method only based on a point feature, and resolves the problem that variations of a virus are hard to detect. For viruses having a small circulating range and not widely spread, the technical solutions of the embodiment of the present disclosure may provide more effective and accurate virus detection.

Embodiment 2

Figure 3:
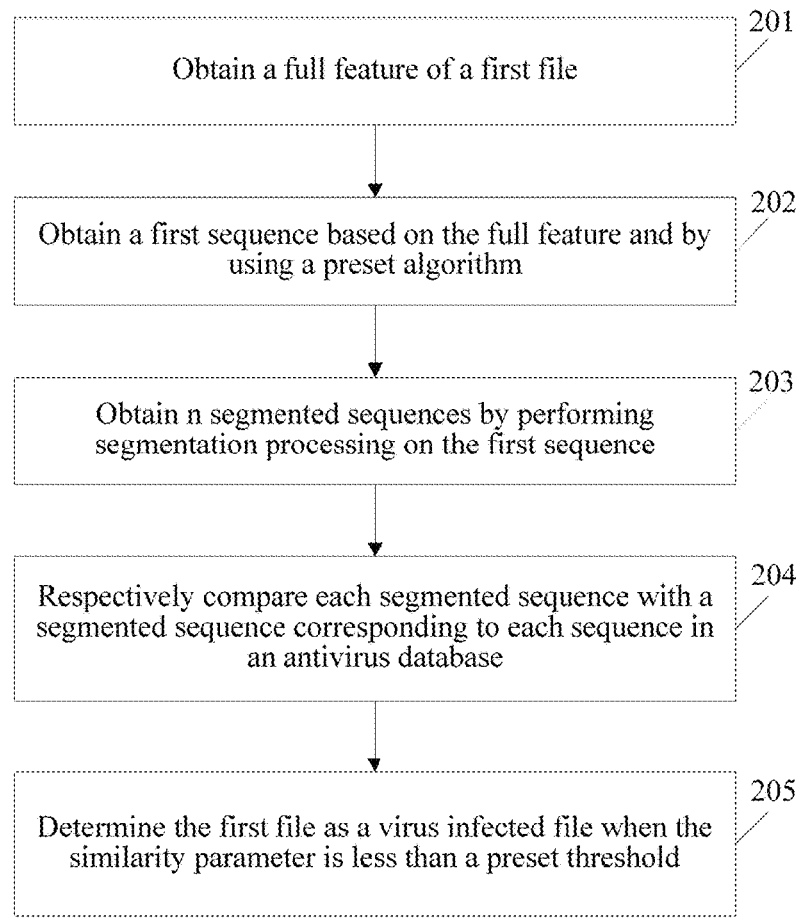
FIG. 3 is a schematic flowchart of a virus program detection method according to Embodiment 2 of the present disclosure.

An embodiment of the present disclosure further provides another virus program detection method. FIG. 3 is a schematic flowchart of a virus program detection method according to Embodiment 2 of the present disclosure. As shown in FIG. 3, the virus program detection method includes:

Step S201: obtain a full characteristic features of a first file, the first file being a sample file collected by a client application (alternatively referred to as a client) or external source, and the full characteristic features being used to uniquely determine all components of the first file;

Step S202: Obtain a first sequence based on the full characteristic features and by using a preset algorithm;

Step S203: Obtain n segmented sequences by performing segmentation processing on the first sequence, n being a positive integer;

Step S204: Compare each segmented sequence with a segmented sequence corresponding to each sequence in an antivirus database, each sequence in the antivirus database corresponding to one type of virus-infected file; and Step S205: Determine the first file as a virus-infected file when a similarity parameter is less than a preset threshold.

The virus program detection method in this implementation may be used for detecting whether a file in an Android system is infected by a virus. The virus program detection method may be implemented in a terminal (alternatively referred to as a terminal device). The terminal may include but is not limited to a mobile terminal such as a mobile phone or a tablet computer. The terminal may alternatively be an electronic device such as a PC. The virus program detection method may alternatively be implemented in a server. The detailed implementation is described below using a terminal as an example.

In step S201 of this embodiment, the terminal may directly receive the full characteristic features of the first file reported by client application (alternatively referred to as a client) or external source. The client application may run on the terminal. Alternatively, the terminal may receive the first file reported from the client application or the external sources, and extract the full characteristic features of the first file by analyzing the received first file. The first file may include but is not limited to an APK file. The first file may alternatively be a file in any format supported by the terminal.

In this embodiment, the full characteristic features of the first file is extracted. The full characteristic features uniquely determine the all components of the first file. Specifically, the first file may include a plurality of components, for example, may include a plurality of subfiles. The extracted full characteristic features of the first file includes characteristic features for each subfile. The characteristic features of each subfile may include but are not limited to the identifier, the size, the format of each subfile, and a character string and/or a code sequence included in each subfile, or the like.

In step S202 of this embodiment, the obtaining a first sequence based on the full characteristic features and by using a preset algorithm, for example, may include: obtaining a first sequence based on the full characteristic features and by, e.g., using the SIMHASH algorithm. For example, each characteristic feature is first processed to generate a hash value (of a predetermined hash length) by using a hash algorithm, and the generated hash values are further used to generate a weighted digit string according to a preset weight. In particular, a corresponding bit of hash sequence corresponding to each feature is accumulated with weight among the features, to generate a sequence of numbers; and the generated sequence of numbers are converted into a sequence of binary bits, including only zeros and ones, to obtain a first sequence. A specific calculation process is not described in detail in this embodiment. The first sequence may be an N-bit binary sequence. N is a positive integer. In one implementation, the first sequence may be a 128-bit binary sequence. Correspondingly, the hash length for such an implementation is 128 bits.

In this embodiment, n segmented sequences may be further obtained by performing segmentation processing on the first sequence. For example, the first sequence may be a 128-bit binary sequence. The 128-bit first sequence may be segmented into n segmented sequences, and the number of bits of each segmented sequence may be 128/n. Based on the comparison manner between the first sequence and multiple sequences in an antivirus database described in Embodiment 1 similarity parameters between segmented sequences of the first sequence and segmented sequences of the multiple sequences in an antivirus database may be obtained, the first file is determined as infected by a virus when the similarity parameter is less than a preset threshold. In on implementation, the preset threshold may be set to n. In some implementations, a value of n may be between 1 and 10.

In step S204 of this embodiment, before comparing each segmented sequence with a segmented sequence corresponding to each sequence in an antivirus database, the method may further include: extracting a full characteristic features of each virus sample file, the full characteristic features of each virus sample file being used to uniquely determine all components of the virus sample file; obtaining a sequence of the virus sample files based on the full characteristic features of the virus sample file and by using a preset algorithm, and performing segmentation processing on the sequence of each virus sample file, to obtain n segmented sequences corresponding to the sequence of each virus sample file, where n is a positive integer; and storing the n segmented sequences and the corresponding sequence of each virus sample file in the antivirus database.

Specifically, before detecting whether a file is infected by a virus, the antivirus database is first established. The antivirus database include hash sequences corresponding to virus sample files and segmented hash sequences of each hash sequence. The manner in which the hash sequence and the segmented hash sequences for virus sample files are obtained may be similar to the manner in which the hash sequence and segmented hash sequences are obtained for the first file. Reference may be made to the processing of the first sequence and its n segmented sequences as described in step S201 to step S203. That is, the full characteristic features is extracted from each virus sample file, and the corresponding hash sequence is obtained based on the extracted full characteristic features and by using the preset algorithm (e.g., the SIMHASH algorithm). The hash sequence can be understood as a hash value obtained by using the SIMHASH algorithm. Segmented hash sequences is obtained by further performing segmentation processing on the obtained hash sequence. Each hash sequence (and its segmented hash sequences) in the antivirus database may correspond to one type of virus-infected file. It can be understood that the plurality of virus sample files may be infected with a same type of virus. When establishing the antivirus database, one or several hash sequences may be stored for one type of virus. That is, the hash sequences stored in the antivirus database contains as much information as possible about features of each type of virus via one of more infected files of each type of virus, thereby reducing detection time and improving detection accuracy.

Figure 4:
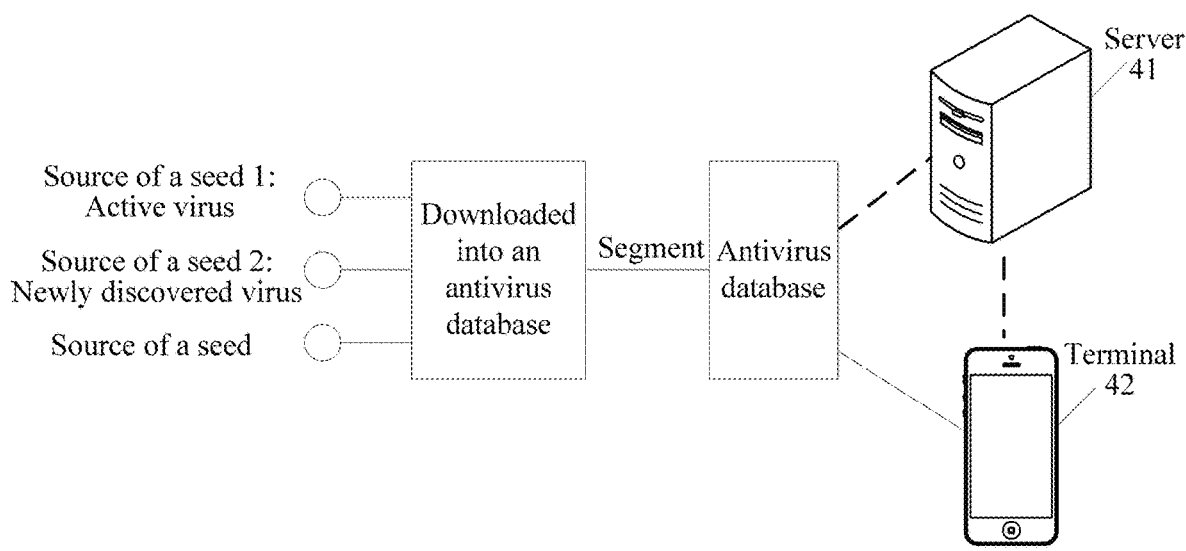
FIG. 4 is a schematic diagram showing establishment of an antivirus database according to Embodiment 2 of the present disclosure.

In some implementations, the antivirus database may be established by using a virus sample provided by another virus engine or a virus sample reported by a terminal. FIG. 4 is a schematic diagram showing establishment of an antivirus database according to Embodiment 2 of the present disclosure. As shown in FIG. 4, a terminal 42 may directly establish the antivirus database by using a virus sample provided by a virus engine. As another implementation, a server 41 may directly establish the antivirus database by using a virus sample provided by a virus engine. The established antivirus database may be transmitted to the terminal 42 by using a communication network. A virus sample in the antivirus database may have a plurality of sources: for example, an active virus, or a newly discovered virus.

In this embodiment, the obtained virus sample is stored into an antivirus database after performing segmentation processing. It can be understood that the antivirus database stores a complete hash value (or sequence) corresponding to each virus sample, and segmented hash values or sequences of each complete hash sequence after performing the segmentation processing.

Particularly for step S204, comparing each segmented sequence of the first sequence with a segmented sequence corresponding to each sequence in an antivirus database includes: comparing n segmented sequences of the first sequence with n segmented sequences corresponding to each sequence in the antivirus database; when a first segmented sequence of the first sequence is the same as a second segmented sequence of a second sequence in the antivirus database, calculating similarity parameters between the first sequence and the second sequence. The first segmented sequence is any segmented sequence of the first sequence; the second sequence is any sequence in the antivirus database; and the second segmented sequence is any segmented sequence of the second sequence.

In step S205 of this embodiment, the first file is determined as infected by a virus when the similarity parameter is less than a preset threshold. Correspondingly, the first file is determined uninfected when each segmented sequence of the first sequence is unequal to a segmented sequence corresponding to each sequence in the antivirus database.

In some implementations, the similarity parameter may comprise a Hamming Code distance. Particularly, a Hamming Code distance between the first sequence and each sequence in the antivirus database may be calculated. The number of bits in two code words and that have different values is referred to as a Hamming Code distance between the two code words. For example, suppose that a first code word is 10101, and a second code word is 00110. In comparison, values of first bits, fourth bits and fifth bits of the two code words are all different, and a Hamming Code distance between the two code words is three. Based on the detection method according to Embodiment 1, it was found that when a Hamming Code distance between two files is less than the predetermined number n, the accuracy that two files belong to one family is greater than 99.9%. Based on this observation, in this embodiment, only a segmented sequence whose Hamming Code distance is n or less than n is focused. The sequence (namely, the obtained hash value) is segmented into n segmented sequences, and the number of bits of each segmented sequence may be 128/n. The probability that segments of two hash values are equal by coincidence is 2 to the negative power of 128/n, otherwise a Hamming Code distance between the hash values is certainly less than n. Based on this, in this embodiment, first, each segmented sequence of the first sequence and all segmented sequences in the antivirus database are compared; and similarity parameters between the first sequence and a second sequence (containing at least a matched segmented sequence) in the antivirus database are calculated, that is, a Hamming Code distance between the first sequence and the second sequence is calculated, after the first segmented sequence of the first sequence and the second segmented sequence of the second sequence in the antivirus database are detected to be equal. When the calculated Hamming Code distance is less than the preset threshold, it shows that the similarity between the first file and a corresponding file in the antivirus database is sufficiently large and that the possibility that the first file is a virus-infected file is sufficiently large, so that the first file may be determined as a virus-infected file. Correspondingly, when the obtained Hamming Code distance is not less than the preset threshold, it shows that the similarity between the first file and the corresponding file in the antivirus database is sufficiently small and that the possibility that the first file is a virus-infected file is sufficiently small, so that the first file may be determined not as a virus-infected file. Experiments show that when the data volume in an antivirus database is, e.g., 100,000, computing time required for detecting similarity of files may be decreased from 1100 ms to approximately 8 ms, greatly increase the detection efficiency.

By using the technical solutions of the embodiment of the present disclosure and based on the full characteristic features effectively resolves the problem that a virus designer can easily get around existing virus detection method based on only point features, and resolves the problem that variations of a virus are hard to detect. For viruses having a small circulating range and not widely spread, the technical solutions of the embodiment of the present disclosure provide more effective and accurate detection. In addition, by using an improved SIMHASH Hamming Code distance detection algorithm, the obtained hash sequence is segmented, and only a Hamming Code distance between sequences that are matched are calculated, greatly reducing detection time, and improving user experience.

Embodiment 3

Figure 5:
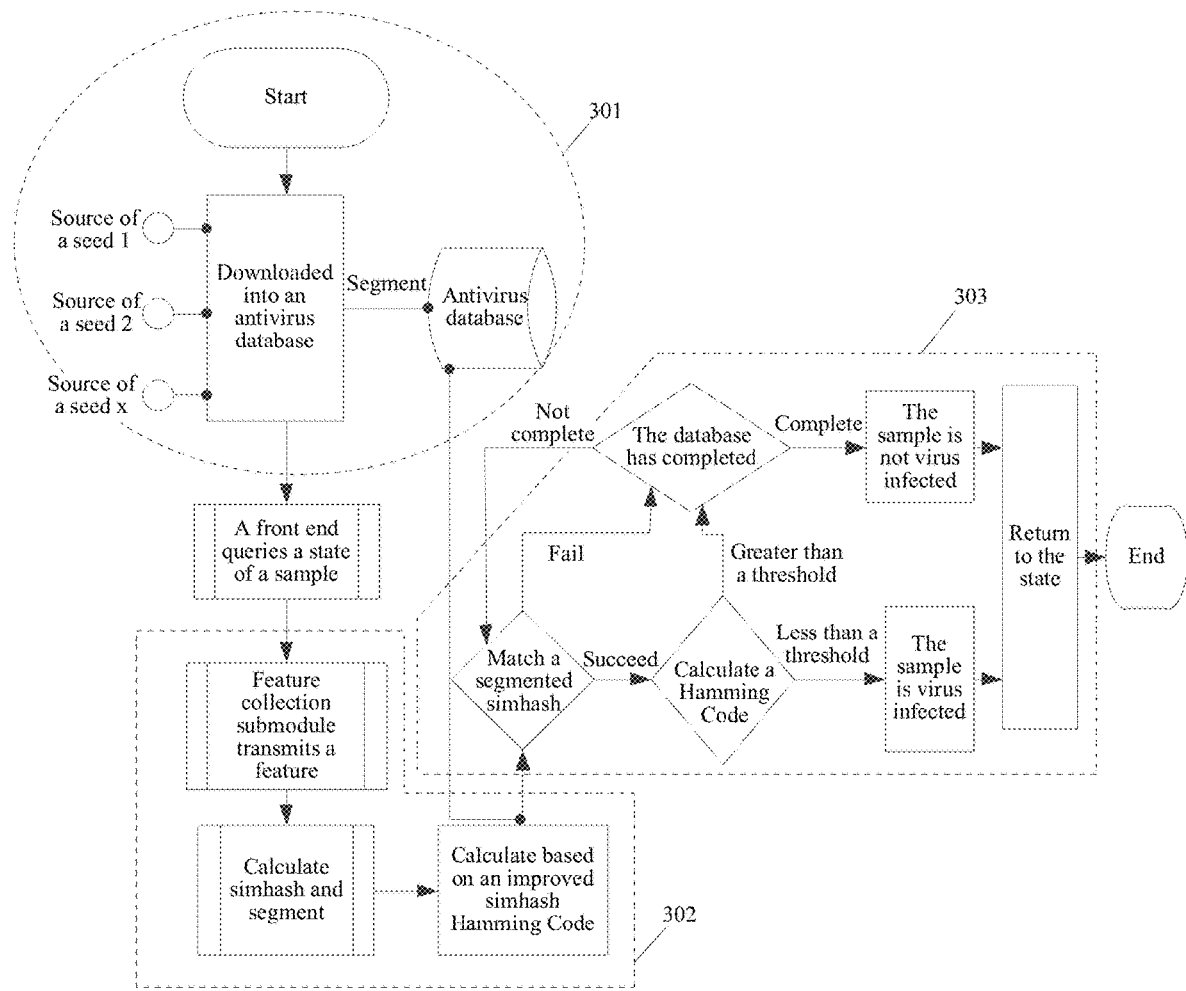
FIG. 5 is a schematic flowchart of a virus program detection method according to Embodiment 3 of the present disclosure.

An embodiment of the present disclosure further provides a virus program detection method. FIG. 5 is a schematic flowchart of a virus program detection method according to Embodiment 3 of the present disclosure. As shown in FIG. 5, the virus program detection method includes:

Step S301: An establishment procedure for establishing an antivirus database;

Step S302: A processing procedure for processing a input file to be virus-detected and for implementing a SIMHASH algorithm on the input file; and Step S303: A detecting procedure for detecting virus in the input file.

In step S301, a virus sample in the antivirus database may be provided by a virus engine of a server, and alternatively be reported by a terminal device or application. A virus sample in the antivirus database may have a plurality of sources: for example, an active virus, or a newly discovered virus. In some implementations, full characteristic features are extracted from a virus sample. A corresponding hash sequence is obtained based on the extracted full characteristic features and by using a preset algorithm (e.g., a SIMHASH algorithm). Segmented hash sequences are further obtained by performing segmentation processing on the obtained hash sequence. The antivirus database stores the segmented hash sequence and a corresponding complete hash sequence. Each hash sequence (and the corresponding segmented hash sequences) in the antivirus database corresponds to one type of virus-infected file. It can be understood that the plurality of virus sample files may be infected with a same type of virus. Therefore, when establishing the antivirus database, only a minimum set of one or several hash sequences may be stored for one type of virus. That is, the hash sequence stored in the antivirus database includes features of virus-infected files of all types as much as possible, namely, hash sequences corresponding to virus-infected files, thereby reducing detection time as much as possible In step S302, when obtaining an APK file to be virus-detected, full characteristic features are extracted from the APK file, a corresponding first hash sequence is obtained based on the extracted full characteristic features and by using the preset algorithm (e.g., the SIMHASH algorithm). Segmented hash sequences are further obtained by performing segmentation processing on the obtained first hash sequence, such that detection based on the improved SIMHASH Hamming Code distance calculation may be performed. The APK file may be obtained from a client on a server side or in a terminal.

Step S303 virus detection procedure based on an improved SIMHASH Hamming Code distance calculation. Specifically, based on the first hash sequence and the segmented hash sequences of the first hash sequence, the antivirus database is traversed. For each virus sample in the antivirus database, matching of segmented hash sequences is performed. If a segmented hash sequence from the first hash sequence is different from a segmented hash sequence of a virus sample, the segmented hash sequence of the first hash sequence is compared with a next segmented hash sequence in the antivirus database. The comparison continues through the segmented hash sequences in the antivirus database till segmented hash sequences of all virus samples in the antivirus database are compared and no match is found. In this case, the APK file may be determined as uninfected. When any segmented hash sequence in the first hash sequence (may be marked as a first segmented hash sequence) and any segmented hash sequence (may be marked as a second segmented hash sequence) in a hash sequence (may be marked as a second hash sequence) in the antivirus database are the same, a Hamming Code distance between the first hash sequence and the second hash sequence is calculated. When the Hamming Code distance is less than a preset threshold, the APK file may be determined as infected. When the Hamming Code distance is not less than a preset threshold, next segmented hash sequence or a segmented hash sequence of next virus sample is matched, till segmented hash sequences of all hash sequences in the antivirus database all complete matching.

Finally that a determination of the file to be virus-detected is infected or safe (uninfected) is output, and the detection procedure is completed.

Embodiment 4

Figure 6:
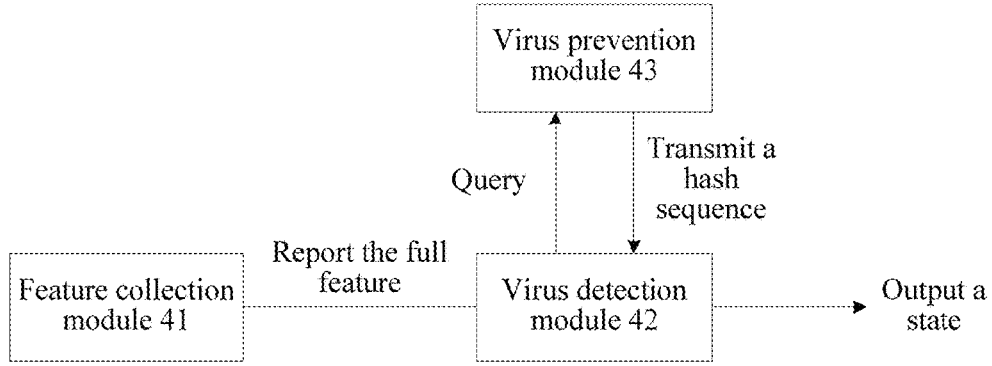
FIG. 6 is a schematic diagram of a terminal device according to an embodiment of the present disclosure.

An embodiment of the present disclosure further provides a terminal. FIG. 6 is a schematic structural composition diagram of a terminal according to an embodiment of the present disclosure. As shown in FIG. 6, the terminal includes: a feature collection module 41, a virus detection module 42, and a virus prevention module 43.

The feature collection module 41 is configured to obtain a full characteristic features of a first file, the first file being a sample file collected by a client application or external source, and the full characteristic features being used to uniquely determine all components of the first file.

The virus detection module 42 is configured to: obtain a first sequence based on the full characteristic features extracted by the feature collection module 41 and by using a preset algorithm; calculate similarity parameters between the first sequence and multiple sequences in the virus prevention module 43; and determine the first file as a virus-infected file when the similarity parameter is less than a preset threshold.

The virus prevention module 43 is configured to store multiple sequences, and each sequence corresponds to one type of virus-infected file.

In this embodiment, the feature collection module 41 may directly receive the full characteristic features of the first file reported by the client application or from external sources. Optionally, the feature collection module 41 may alternatively receive the first file reported by the client application or external resources, and extract the full characteristic features of the first file according to the received first file. The full characteristic features are used to uniquely determine all components of the first file. Specifically, the first file may include a plurality of components, for example, may include a plurality of subfiles. The extracted full characteristic features of the first file includes a feature of each subfile. The feature of each subfile may specifically include the identifier, the size, the format of each subfile, a character string, a code sequence included in each subfile, or the like. The first file may specifically be an APK file. In some implementations, the first file may alternatively be a file in any format supported by the terminal.

In this embodiment, the virus detection module 42 obtains a first sequence based on the full characteristic features and by using a SIMHASH algorithm. Obtaining a first sequence by using a SIMHASH algorithm may include obtaining a first sequence with reference to an implementation process of the SIMHASH algorithm. For example, each characteristic feature is first processed to generate a hash value by using a hash algorithm, and the generated hash values are further used to generate a weighted digit string according to a preset weight. In particular, a corresponding bit of a hash sequence corresponding to each feature is accumulated, to generate a sequence of numbers; and the generated sequence of numbers are converted into a binary bits, including only zero and one, to obtain a first sequence. A specific calculation process is not described in detail in this embodiment. The first sequence may be an N-bit binary sequence. N is a positive integer. In one implementation, the first sequence may be a 128-bit binary sequence. Correspondingly, the hash length for such an implementation is 128 bits.

In this embodiment, the virus prevention module 43 is configured to: before respectively calculating similarity parameters between the first sequence and multiple sequences in an antivirus database, collect a plurality of virus sample files; extract a full characteristic features of each virus sample file, and obtain and store a sequence based on the full characteristic features and by using a preset algorithm.

Specifically, before the virus detection module 42 detects whether a file is a virus-infected file, the antivirus database is first established by using a virus prevention module 43. The antivirus database includes hash sequences that have been determined to correspond to a virus sample files. For a manner in which the hash sequences are obtained, reference may be made to a calculation manner of the first sequence according to this embodiment. That is, the full characteristic features are extracted from each virus sample file, and the corresponding sequence is obtained based on the extracted full characteristic features and by using a preset algorithm (may specifically be a SIMHASH algorithm). Each hash sequence in the antivirus database corresponds to one type of virus-infected file. It can be understood that the plurality of virus sample files are possibly infected with a same type of virus. Therefore, when establishing the antivirus database, only a minimum set of one or several hash sequences may be stored for one type of virus. That is, the hash sequence stored in the antivirus database includes features of virus-infected files of all types as much as possible, (namely, hash sequences corresponding to virus-infected files), thereby reducing detection time as much as possible. In an actual application, the antivirus database may be established by using a virus sample provided by another virus engine or a virus sample reported by a terminal. A virus sample in the antivirus database may have a plurality of sources: an active virus, a newly discovered virus and so on.

In this embodiment, the virus detection module 42 calculates similarity parameters between the first sequence and multiple sequences in an antivirus database; and the first file is determined as a virus-infected file when the similarity parameter is less than a preset threshold. Correspondingly, the first file may be determined as uninfected by a virus when the similarity parameter is not less than a preset threshold.

In some implementations, the similarity parameter may comprise a Hamming Code distance. That is, a Hamming Code distance between the first sequence and each sequence in the antivirus database may be calculated. The number of bits that correspond to two code words and that have different values is referred to as a Hamming Code distance between the two code words. For example, a first code word is 10101, and a second code word is 00110. In comparison, values of first bit, fourth bit and fifth bit of the two code words are all different, and a Hamming Code distance between the two code words is three. In some implementations, the virus detection module 42 may calculate a Hamming Code distance between the first sequence and each sequence in the antivirus database, and determine whether the Hamming Code distance is less than a preset threshold. The preset threshold may be preset according to human experience. In some exemplary implementation, a value of the preset threshold may be between one to ten. When the obtained Hamming Code distance between the first sequence and a sequence in the antivirus database corresponding to an infected file is less than the preset threshold, it may indicate that the first file and corresponding files of the sequences in the antivirus database is sufficiently similar. It also shows that the possibility that the first file is a virus-infected file is sufficiently large, so that the first file may be determined as a virus-infected file. Correspondingly, when the obtained Hamming Code distance is not less than the preset threshold, it may indicate that the first file and corresponding files of the sequences in the antivirus database is sufficiently dissimilar. It also shows that the possibility that the first file is a virus-infected file is excessively little, so that the first file may be determined as uninfected file.

Embodiment 5

An embodiment of the present disclosure further provides a terminal. As shown in FIG. 6, the terminal includes: a feature collection module 41, a virus detection module 42, and a virus prevention module 43.

The feature collection module 41 is configured to obtain a full characteristic features of a first file, the first file being a sample file collected by a client application or external source, and the full characteristic features being used to uniquely determine all components of the first file.

The virus detection module 42 is configured to: obtain a first sequence based on the full characteristic features extracted by the feature collection module 41 and by using a preset algorithm; obtain n segmented sequences by performing segmentation processing on the first sequence, n being a positive integer; and further compare each segmented sequence with segmented sequences corresponding to each sequence in an antivirus database, and determine whether the first file is a virus-infected file based on a comparison result.

The virus prevention module 43 is configured to store multiple sequences, and each sequence corresponds to one type of virus-infected file.

In this embodiment, the feature collection module 41 may directly receive the full characteristic features of the first file reported by the client application or external sources. Optionally, the feature collection module 41 may alternatively receive the first file reported by the client application or external sources, and extract the full characteristic features of the first file according to the received first file. The full characteristic features are used to uniquely determine all components of the first file. Specifically, the first file may include a plurality of components, for example, may include a plurality of subfiles. The extracted full characteristic features of the first file includes a feature of each subfile. The feature of each subfile may specifically include the identifier, the size, the format of each subfile, a character string, a code sequence included in each subfile, or the like. The first file may specifically be an APK file. In some implementations, the first file may alternatively be a file in any format supported by the terminal.

In this embodiment, the virus prevention module 43 is configured to: before the virus detection module 42 respectively compares each segmented sequence with a segmented sequence corresponding to each sequence in an antivirus database, collect multiple virus sample files; extract a full characteristic features of each virus sample file, where the full characteristic features of the virus sample file is used to uniquely determine all components of the virus sample file; and obtain a sequence of the virus sample file based on the full characteristic features of the virus sample file and by using the preset algorithm; perform segmentation processing on a sequence of each virus sample file, and obtain n segmented sequences corresponding to the sequence of each virus sample file, where n is a positive integer; and store the n segmented sequences and corresponding sequences.

Specifically, before the virus detection module 42 detects whether a file is a virus-infected file, the antivirus database is first established by using a virus prevention module 43. The antivirus database includes hash sequences that have been determined to correspond to a virus sample file and a segmented hash sequence that corresponds to the hash sequence. For manner in which the hash sequences and segmented has sequences are obtained, reference may be made to a calculation manner of the first sequence according to this embodiment and an obtaining manner of the n segmented sequences. That is, the full characteristic features is extracted from each virus sample file, and the corresponding sequence is obtained based on the extracted full characteristic features and by using a preset algorithm (may specifically be a SIMHASH algorithm). The hash sequence can be understood as a hash value obtained by using the SIMHASH algorithm. A segmented hash sequence is obtained by further performing segmentation processing on the obtained hash sequence. Each hash sequence (and segmented hash sequence) in the antivirus database corresponds to one type of virus-infected file. It can be understood that the plurality of virus sample files are possibly infected with a same type of virus. Therefore, when establishing the antivirus database, only a minimum set of one or several hash sequences may be stored for one type of virus. That is, the hash sequence stored in the antivirus database includes features of virus-infected files of all types as much as possible, (namely, hash sequences corresponding to virus-infected files), thereby reducing detection time as much as possible. In an actual application, the antivirus database may be established by using a virus sample provided by another virus engine or a virus sample reported by a terminal. A virus sample in the antivirus database may have a plurality of sources: an active virus, a newly discovered virus and so on.

Figure 7:
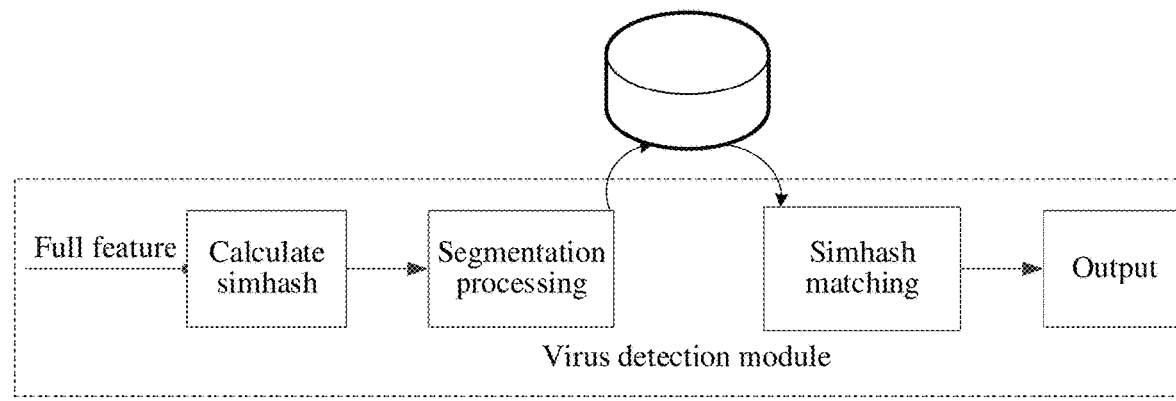
FIG. 7 is an exemplary schematic diagram of the virus detection module of FIG. 6.

FIG. 7 is a schematic diagram of a processing procedure of a virus detection module 42 according to an embodiment of the present disclosure. As shown in FIG. 7, after obtaining the full characteristic features of the feature collection module 41, a hash sequence (namely, the first sequence) is r obtained by using a SIMHASH algorithm, the obtained hash sequence segmented, a sequence in an antivirus database is matched, and finally an output is produced based on a matching result.

Specifically, in this embodiment, the virus detection module 42 obtains a first sequence based on the full characteristic features and by using a SIMHASH algorithm. The obtaining a first sequence by using a SIMHASH algorithm may comprise obtaining a first sequence with reference to an implementation process of the SIMHASH algorithm. For example, each feature is first enabled to correspondingly generate a hash value by using a hash algorithm, and the generated hash value is processed to generate a weighted digit string according to a preset weight; a corresponding bit of a sequence value corresponding to each feature is accumulated, to generate a sequence of numbers; and the generated sequence of numbers are converted into a sequence of binary bits including only zeros and ones, to obtain a first sequence. A specific calculation process is not described in detail in this embodiment. The first sequence may be an N-bit binary sequence, and N is a positive integer. As an implementation, the first sequence may specifically be a 128-bit binary sequence. Correspondingly, the hash length for such an implementation is 128 bits.

In this embodiment, the virus detection module 42 obtains n segment sequences by performing segmentation processing on the first sequence. For example, the first sequence may be a 128-bit binary sequence, the first sequence may be segmented into n segments, and the number of bits of each segment sequence is 128/n. Based on the comparison manner between the first sequence and multiple sequences in an antivirus database in Embodiment 4, similarity parameters between segmented sequences of the first sequence and segmented sequences of multiple sequences in an antivirus database may be obtained, the first file is determined as a virus-infected file when the similarity parameter is less than a preset threshold. In this embodiment, the preset threshold may be set to n. In some implementations, a value of n may be between one and ten.

In this embodiment, the virus detection module 42 is configured to compare each segmented sequence of the first sequence with a segmented sequence corresponding to each sequence in the antivirus database.

When a first segmented sequence of the first sequence is the same as a second segmented sequence of a second sequence in the antivirus database, similarity parameters between the first sequence and the second sequence are calculated. The first segmented sequence is any segmented sequence of the first sequence; the second sequence is any sequence in the antivirus database; and the second segmented sequence is any segmented sequence of the second sequence. The first file is determined as a virus-infected file when the similarity parameter is less than a preset threshold.

Correspondingly, the virus detection module 42 is further configured to determine the first file as uninfected when each segmented sequence of the first sequence is unequal to a segmented sequence corresponding to each sequence in the antivirus database.

In some implementations, the similarity parameter may comprise a Hamming Code distance. Particularly, a Hamming Code distance between the first sequence and each sequence in the antivirus database may be calculated. The number of bits in two code words and that have different values is referred to as a Hamming Code distance between the two code words. For example, suppose that a first code word includes 10101, and a second code word includes 00110. In comparison, values of first bits, fourth bits and fifth bits of the two code words are all different, and a Hamming Code distance between the two code words is three. Based on the detection method according to Embodiment 4, it was found that when a Hamming Code distance between two files is less than the predetermined number n, the accuracy that two files belong to one family is greater than 99.9%. Based on this observation, in this embodiment, only a segmented sequence whose Hamming Code distance is n or less than n is focused. The sequence (namely, the obtained hash value) is segmented into n segmented sequences, and the number of bits of each segmented sequence may be 128/n. The probability that segments of two hash values are equal by coincidence is 2 raised to the negative power of 128/x, otherwise a Hamming Code distance between the hash values is certainly less than n. Based on this, in this embodiment, first, the virus detection module 42 respectively matches each segmented sequence of the first sequence with all segmented sequences in the antivirus database; and similarity parameters between the first sequence and the second sequence (containing at least a matched segmented sequence) are calculated (that is, a Hamming Code distance is calculated), after the first segmented sequence of the first sequence and the second segmented sequence of the second sequence in the antivirus database are detected to be equal. When the obtained Hamming Code distance is less than the preset threshold, it may indicate that the first file and corresponding files of the sequences in the antivirus database is sufficiently similar. It also shows that the possibility that the first file is a virus-infected file is sufficiently great, so that the first file may be determined as a virus-infected file. Correspondingly, when the obtained Hamming Code distance is not less than the preset threshold, it may indicate that the first file and corresponding files of the sequences in the antivirus database is sufficiently dissimilar. It also shows that the possibility that the first file is a virus-infected file is sufficiently small, so that the first file may be determined not an uninfected file. The experiment shows that when the data volume in an antivirus database is 100,000, time required for detecting a hash value of a file may be decreased from 1100 ms to approximately 8 ms, greatly reducing time required for detecting the file.

In embodiment 4 and embodiment 5 of the present disclosure, the feature collection module 41, the virus detection module 42 and the virus prevention module 43 in the terminal all may be implemented by using a central processing unit (CPU), a digital signal processor (DSP), a microcontroller unit (MCU) or a field-programmable gate array (FPGA) in the terminal.

Figure 8:
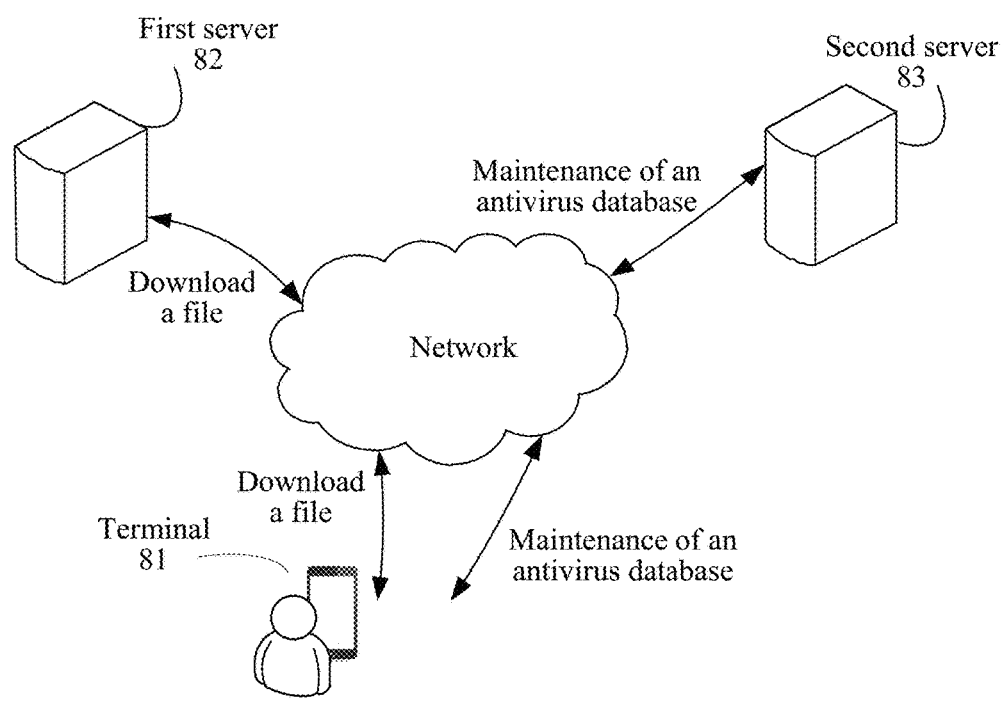
FIG. 8 is a schematic diagram of an application environment of a terminal device according to an embodiment of the present disclosure.

FIG. 8 is a schematic diagram of an application architecture of a terminal according to an embodiment of the present disclosure. As shown in FIG. 8, the application architecture includes a terminal 81 and a first server 82. The application architecture is configured in an application scenario where a terminal downloads a file by using a network. For example, a terminal 81 is to download an application file by using an application store, the terminal 81 and a first server 82 that corresponds to the application file establish connection by using a network, and the terminal 81 downloads the application file from the first server 82. After obtaining the application file, the terminal 81 detects whether the application file is a safe file or a virus-infected file by using technical solutions in an embodiment of the present disclosure. Before detection or during detection or after detection, the terminal and a second server 83 that corresponds to an antivirus database may further establish connection, to maintain an antivirus database in the terminal 81, update the antivirus database, and so on.

Figure 9A:
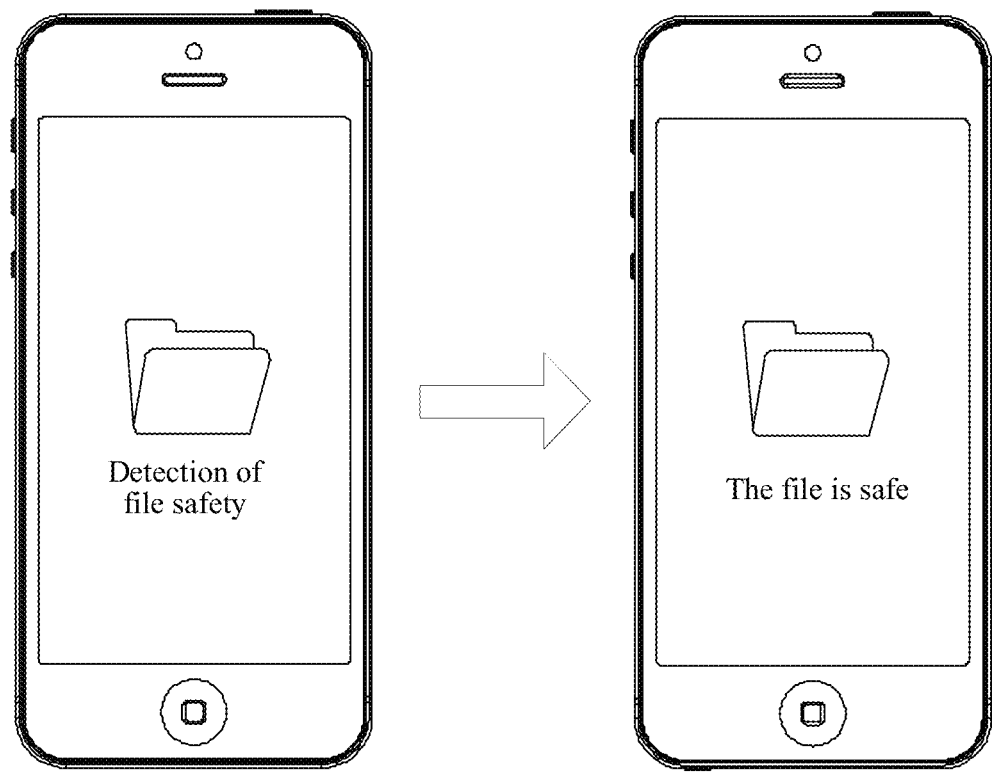
FIG. 9a and FIG. 9b illustrates an exemplary terminal device implementing a virus detection.
Figure 9B:
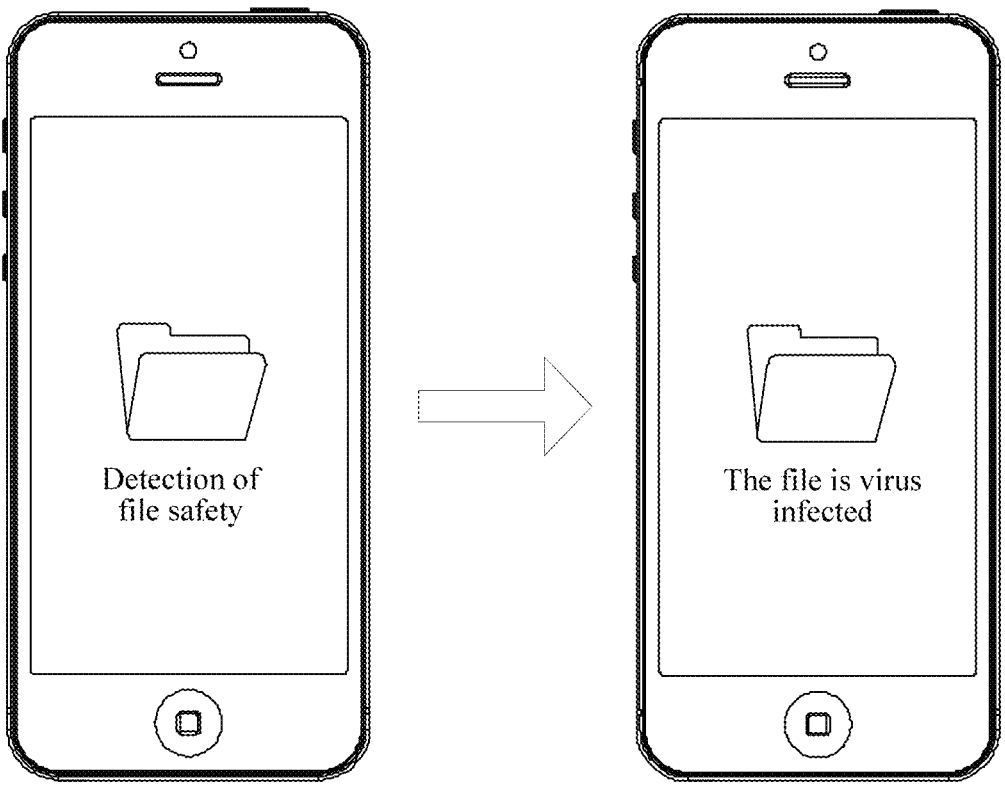

FIG. 9*a* and FIG. 9*b* are schematic diagrams of application of a terminal according to an embodiment of the present disclosure. As shown in FIG. 9*a*, a detection function of a terminal can detect file safety, and prompt a user that the file is safe after determining the file is safe. As shown in FIG. 9*b*, a detection function of a terminal can detect file safety, and prompt a user that the file is virus-infected, should be deleted and so on after determining that the file is virus-infected.

Figure 10:
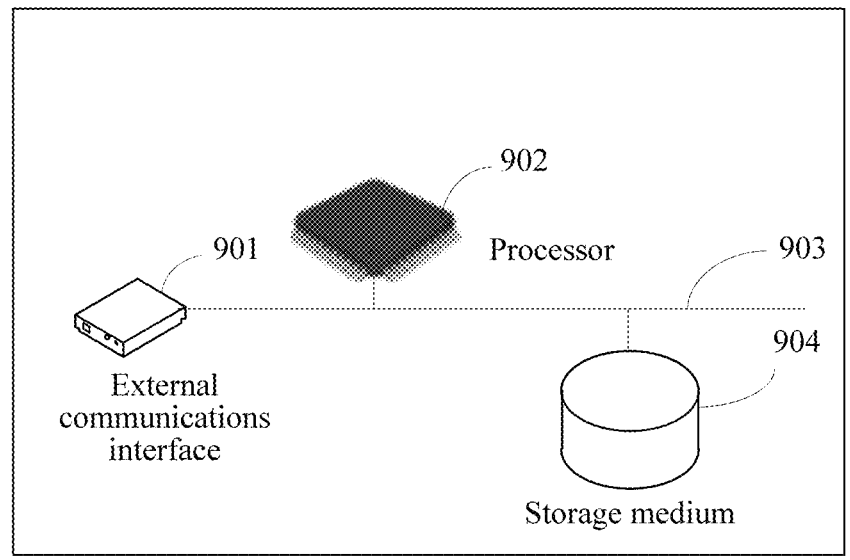
FIG. 10 is an exemplary schematic diagram of a terminal device.

FIG. 10 is a schematic diagram of a hardware structure of a terminal according to an embodiment of the present disclosure. The terminal, as an example of a hardware entity, is as shown in FIG. 10. The apparatus includes a processor 902, a storage medium 904, and at least one external communications interface 901. The processor 902, the storage medium 904, and the external communications interface 901 are connected to each other by using a bus 903.

The storage medium 904 may be a nonvolatile storage medium that stores program instructions. When executing the program instructions that are stored in the storage medium 904, the processor 902 may perform the following steps:

obtaining a full characteristic features of a first file, the first file being a sample file collected by a client application or from external sources, and the full characteristic features of the first file being used to uniquely determine all components of the first file;

obtaining a first sequence based on the full characteristic features and by using a preset algorithm;

calculating similarity parameters between the first sequence and multiple sequences in an antivirus database, each sequence in the antivirus database corresponding to one type of virus-infected file; and determining the first file as a virus-infected file when the similarity parameter is less than a preset threshold.

In an embodiment, the processor 902 further executes the program instructions that are stored in the storage medium 904, to perform the following steps:

collecting multiple virus sample files;

extracting a full characteristic features of each virus sample file, the full characteristic features of the virus sample file being used to uniquely determine all components of the virus sample file; and obtaining sequences of the virus sample files based on the full characteristic features of the virus sample file and by using a preset algorithm, and generating an antivirus database based on sequences of the obtained plurality of virus sample files.

In an embodiment, the processor 902 further executes the program instructions that are stored in the storage medium 904, to perform the following steps:

performing segmentation processing on the sequence of each virus sample file, to obtain n segmented sequences corresponding to the sequence, where n is a positive integer; and storing the n segmented sequences and the corresponding sequence in the antivirus database.

In an embodiment, the processor 902 further executes the program instructions that are stored in the storage medium 904, to perform the following steps:

performing segmentation processing on the first sequence to obtain n segmented sequences of the first sequence; and respectively comparing the n segmented sequences of the first sequence with the n segmented sequences corresponding to each sequence in the antivirus database, and determining the similarity parameters based on comparison results.

In an embodiment, the processor 902 further executes the program instructions that are stored in the storage medium 904, to perform the following steps:

respectively comparing the n segmented sequences of the first sequence with the n segmented sequences corresponding to each sequence in the antivirus database, and When a first segmented sequence of the first sequence is the same as a second segmented sequence of a second sequence in the antivirus database, the similarity parameters between the first s sequence and the second sequence are calculated. The first segmented sequence is any segmented sequence of the first sequence; the second sequence is any sequence in the antivirus database; and the second segmented sequence is any segmented sequence of the second sequence.

In an embodiment, the processor 902 further executes the program instructions that are stored in the storage medium 904, to perform the following steps:

The first file is determined as an uninfected file when each segmented sequence of the first sequence is unequal to a segmented sequence corresponding to each sequence in the antivirus database.

In an embodiment, the processor 902 further executes the program instructions that are stored in the storage medium 904, to perform the following steps:

receiving the full characteristic features of the first file that is reported by the client application or external sources; or receiving the first file reported by the client application or external sources, and extracting the full characteristic features of the first file according to the received first file.

In an embodiment, the preset algorithm is a SIMHASH algorithm.

It should be noted that the foregoing description related to the terminal is similar to the foregoing description of the method, and is the same as the beneficial effect of the method. Therefore, details are not described herein. For technical details that are not disclosed in the server embodiments of the present disclosure, refer to descriptions of the method embodiments of the present disclosure.

Figure 11:
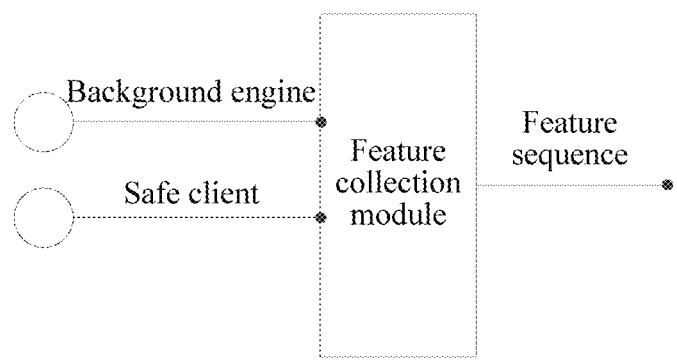
FIG. 11 is an exemplary schematic diagram of the feature collection module of FIG. 6.

The foregoing embodiments of the present disclosure are described as applied to a terminal for performing a virus program detection method. In another implementations, the virus program detection method may alternatively be applied in a server. For each composing unit in the server and a function of each composing unit, reference may be made to description manners of the terminal of Embodiment 4 and Embodiment 5. FIG. 11 is a schematic diagram of a processing procedure of a feature collection module according to an embodiment of the present disclosure. As shown in FIG. 11, when the feature collection module extracts a full characteristic features, the collection of features may be performed by a client application of a terminal in one implementation and by a background engine on a server side in another implementation. A feature sequence that represents the full characteristic features is obtained after the collection process.

In the several embodiments provided in this application, it should be understood that the disclosed device and method may be implemented in other manners. The described device embodiments are merely exemplary. For example, the division of unites or modules is merely based on division of logical functions and may be implemented in other manners. For example, multiple units or components may be combined or integrated into on unit, or some features may be ignored or not performed. In addition, the illustrated or discussed mutual couplings or direct couplings or communication connections between the components may be implemented via some interfaces, via indirect couplings or communication connections between the devices or units, or electrical connections, mechanical connections, or connections in other forms.

The units described as separate parts may be or may not be physically separated. The part described as a unit may be or may not be a physical unit. That is, the units may be located in a same place, or may be distributed to many network units. A subset of or all of the units may to be selected according to actual requirements of specific implement.

In addition, functional units in the embodiments of the present disclosure may be all integrated in a processing unit, or implemented as separate units, or implemented as separate groups of integrated units. The integrated unit may be implemented in a form of hardware, or may be implemented in form of hardware plus a software functional unit.

A person of ordinary skill in the art may understand that, some or all of steps for implementing the method embodiments may be implemented by using hardware controlled by program instructions. The program may be stored in a computer readable storage medium. When the program is executed, the steps including the method embodiments are performed. However, the storage medium includes various types of media that may store program code, for example, a mobile storage device, a read-only memory (ROM), a random access memory (RAM), a magnetic disk, or an optical disk.

Alternatively, when the integrated unit of the present disclosure is implemented in a form of a software functional module and sold or used as an independent product, the integrated unit may be stored in a computer-readable storage medium. Based on such an understanding, the technical solutions of the embodiments of the present disclosure essentially, or the part contributing to the existing technology may be implemented in a form of a software product. The computer software product is stored in a storage medium and includes several instructions for instructing a computer device (which may be a personal computer, a server, a network device, or the like) to perform all or some of the methods described in the embodiments of the present disclosure. The foregoing storage medium includes: any media that can store program code, such as a removable storage device, a ROM, a RAM, a magnetic disk, or an optical disc.

The foregoing descriptions are merely exemplary implementations of the present disclosure, but are not intended to limit the protection scope of the present disclosure. Any variation or replacement readily derivable by a person skilled in the art within the technical scope disclosed in the present disclosure shall fall within the protection scope of the present disclosure. Therefore, the protection scope of the present disclosure shall be subject to the protection scope of the claims.

What is claimed is:

1. A virus program detection method by a terminal device comprising a processor, the method comprising:
   obtaining a full characteristic features of a first file, the first file being a sample file collected by a client application of the terminal device, and the full characteristic features of the first file being used to uniquely determine all components of the first file;
   obtaining a first binary hash sequence based on the full characteristic features of the first file and by using a preset hash algorithm;
   collecting multiple virus sample files;
   extracting a full characteristic features of each of the multiple virus sample files, wherein the full characteristic features of each of the multiple virus sample files uniquely determine all components of each of the multiple virus sample files;
   obtaining reference binary hash sequences each for each of the multiple virus sample files based on the full characteristic features of each of the multiple virus sample files and by using the preset hash algorithm;
   generating an antivirus database based on the reference binary hash sequences;
   calculating similarity parameters between the first binary hash sequence and the reference binary hash sequences in the antivirus database, each binary hash sequence in the antivirus database corresponding to one type of virus-infected file; and
   determining the first file as a virus-infected file when at least one of the similarity parameters is less than a preset similarity threshold.

2. The method according to claim 1, wherein generating the antivirus database based on the reference binary hash sequences comprises:
   performing segmentation processing on each of the reference binary hash sequences to obtain n segmented sequences for each of the reference binary hash sequences, wherein n is a positive integer; and
   storing the n segmented sequences for each of the reference binary hash sequences and the reference binary hash sequences in the antivirus database.

3. The method according to claim 2,
   wherein after the obtaining the first binary hash sequence based on the full characteristic features of the first file and by using a preset hash algorithm, the method further comprise performing segmentation processing on the first binary hash sequence, to obtain n segmented sequences of the first binary hash sequence; and
   wherein calculating similarity parameters between the first binary hash sequence for the first file and multiple binary hash sequences in an antivirus database comprises comparing the n segmented sequences of the first binary hash sequence with the n segmented sequences corresponding to each of the reference binary hash sequences in the antivirus database, and determining the similarity parameters based on the comparing.

4. The method according to claim 3, wherein comparing the n segmented sequences of the first binary hash sequence with the n segmented sequences corresponding to each of the reference binary hash sequences in the antivirus database, and determining the similarity parameters based on the comparing comprises:
   comparing the n segmented sequences of the first binary hash sequence with the n segmented sequences corresponding to each of the reference binary hash sequences in the antivirus database; and
   calculating, when any one of the n segmented sequences of the first binary hash sequence matches any one of the n segmented sequences of the reference binary hash sequences in the antivirus database, a similarity parameter between the first binary hash sequence and a second binary hash sequence in the antivirus database corresponding to the one of the n segmented sequences of the reference binary hash sequences in the antivirus database that matches the one of the n segmented sequences of the first binary hash sequence.

5. The method according to claim 4, further comprising: determining, when each of the n segmented sequences of the first binary hash sequence does not match any one of the n segmented sequences of the reference binary hash sequences in the antivirus database, that the first file is not a virus-infected file.

6. The method according to claim 1, wherein obtaining the full characteristic features of the first file comprises:
   receiving the full characteristic features of the first file reported by a client application of the terminal device; or
   receiving the first file reported by the client application of the terminal device, and extracting the full characteristic features of the first file according to the first file.

7. The method according to any one of claim 1, wherein the preset hash algorithm is a fuzzy hash algorithm.

8. A terminal device, comprising a memory for storing a set of instructions and a processor in communication with the memory, the processor, when executing the set of instructions, is configured to:
   obtain a full characteristic features of a first file, the first file being a sample file collected by a client application of the terminal device, and the full characteristic features being used to uniquely determine all components of the first file;
   collect multiple virus sample files;
   extract full characteristic features of each of the multiple virus sample files, wherein the full characteristic features of each of the multiple virus sample files uniquely determine all components of each of the multiple virus sample files;
   obtain reference binary hash sequences each for each of the multiple virus sample files based on the full characteristic features of each of the multiple virus sample files and by using a preset hash algorithm;

generate an antivirus database based on the reference
reference binary hash sequences;
obtain a first binary hash sequence based on the full
characteristic features of the first file and by using a
preset hash algorithm;
calculate similarity parameters between the first binary
hash sequence and the reference binary hash sequences
in the antivirus database; and
determine the first file as a virus-infected file when at least
one of the similarity parameter is less than a preset
similarity threshold.

9. The terminal device according to claim 8, wherein the processor, when executing the set of instructions to maintain the reference binary hash sequences in the antivirus database, is configured to:
perform segmentation processing on each of the reference binary hash sequences to obtain n segmented sequences for each of the reference binary hash sequences, wherein n is a positive integer; and
store the n segmented sequences for each of the reference binary hash sequences and the reference binary hash sequences in the antivirus database.

10. The terminal device according to claim 9, wherein the processor, when executing the set of instructions, is further configured to
perform segmentation processing on the first binary hash sequence, to obtain n segmented sequences of the first binary hash sequence; and
wherein the processor, when executing the set of instructions to calculate the similarity parameters, is configured to compare the n segmented sequences of the first binary hash sequence with the n segmented sequences corresponding to each of the reference binary hash sequences in the antivirus database, and determine the similarity parameters based on comparison.

11. The terminal device according to claim 10, wherein the processor, when executing the set of instructions, is further configured to:
compare the n segmented sequences of the first binary hash sequence with the n segmented sequences corresponding to each of the reference binary hash sequences in the antivirus database; and
calculate, when any one of the n segmented sequences of the first binary hash sequence matches any one of the n segmented sequences of the reference binary hash sequences in the antivirus database, a similarity parameter between the first binary hash sequence and a second binary hash sequence in the antivirus database corresponding to the one of the n segmented sequences of the reference binary hash sequences in the antivirus database that matches the one of the n segmented sequences of the first binary hash sequence.

12. The terminal device according to claim 11, wherein the processor, when executing the set of instructions, is further configured to determine, when each of the n segmented sequences of the first binary hash sequence does not match any one of the n segmented sequences of the reference binary hash sequences in the antivirus database, that the first file is not a virus-infected file.

13. The terminal device according to claim 8, wherein the processor, when executing the set of instructions, is further configured to:
receive the full characteristic features of the first file reported by a client application of the terminal device; or
receive the first file reported by the client application of the terminal device, and extract the full characteristic features of the first file according to the first file.

14. The terminal device according to any one of claim 8, wherein the preset hash algorithm is a fuzzy hash algorithm.

15. A non-transitory computer readable storage medium for storing program instructions, the program instructions, when executed by a processor of a terminal device, cause the terminal device to perform:
collecting multiple virus sample files;
extracting a full characteristic features of each of the multiple virus sample files, wherein the full characteristic features of each of the multiple virus sample files uniquely determine all components of each of the multiple virus sample files;
obtaining reference binary hash sequences each for each of the multiple virus sample files based on the full characteristic features of each of the multiple virus sample files and by using a preset hash algorithm;
generating an antivirus database based on the reference binary hash sequences;
obtaining a full characteristic features of a first file, the first file being a sample file collected by a client application of the terminal device, and the full characteristic features of the first file being used to uniquely determine all components of the first file;
obtaining a first binary hash sequence based on the full characteristic features of the first file and by using a preset hash algorithm;
calculating similarity parameters between the first binary hash sequence and multiple binary hash sequences in the antivirus database, each binary hash sequence in the antivirus database corresponding to one type of virus-infected file; and
determining the first file as a virus-infected file when at least one of the similarity parameters is less than a preset similarity threshold.

16. The non-transitory computer readable storage medium of claim 15, wherein the program instructions, when executed by the processor of the terminal device, further cause the terminal device to perform:
performing segmentation processing on each of the reference binary hash sequences to obtain n segmented sequences for each of the reference binary hash sequences, wherein n is a positive integer; and
storing the n segmented sequences for each of the reference binary hash sequences and the reference binary hash sequences in the antivirus database.

17. The non-transitory computer readable storage medium of claim 16, wherein the program instructions, when executed by the processor of the terminal device, further cause the terminal device to perform:
performing segmentation processing on the first binary hash sequence, to obtain n segmented sequences of the first binary hash sequence; and
comparing the n segmented sequences of the first binary hash sequence with the n segmented sequences corresponding to each of the reference binary hash sequences in the antivirus database, and determining the similarity parameters based on the comparing.

* * * * *